April 25, 1944. H. G. MUENCHINGER 2,347,360
SELF-TAPPING SCREW
Filed Aug. 3, 1942 2 Sheets-Sheet 2
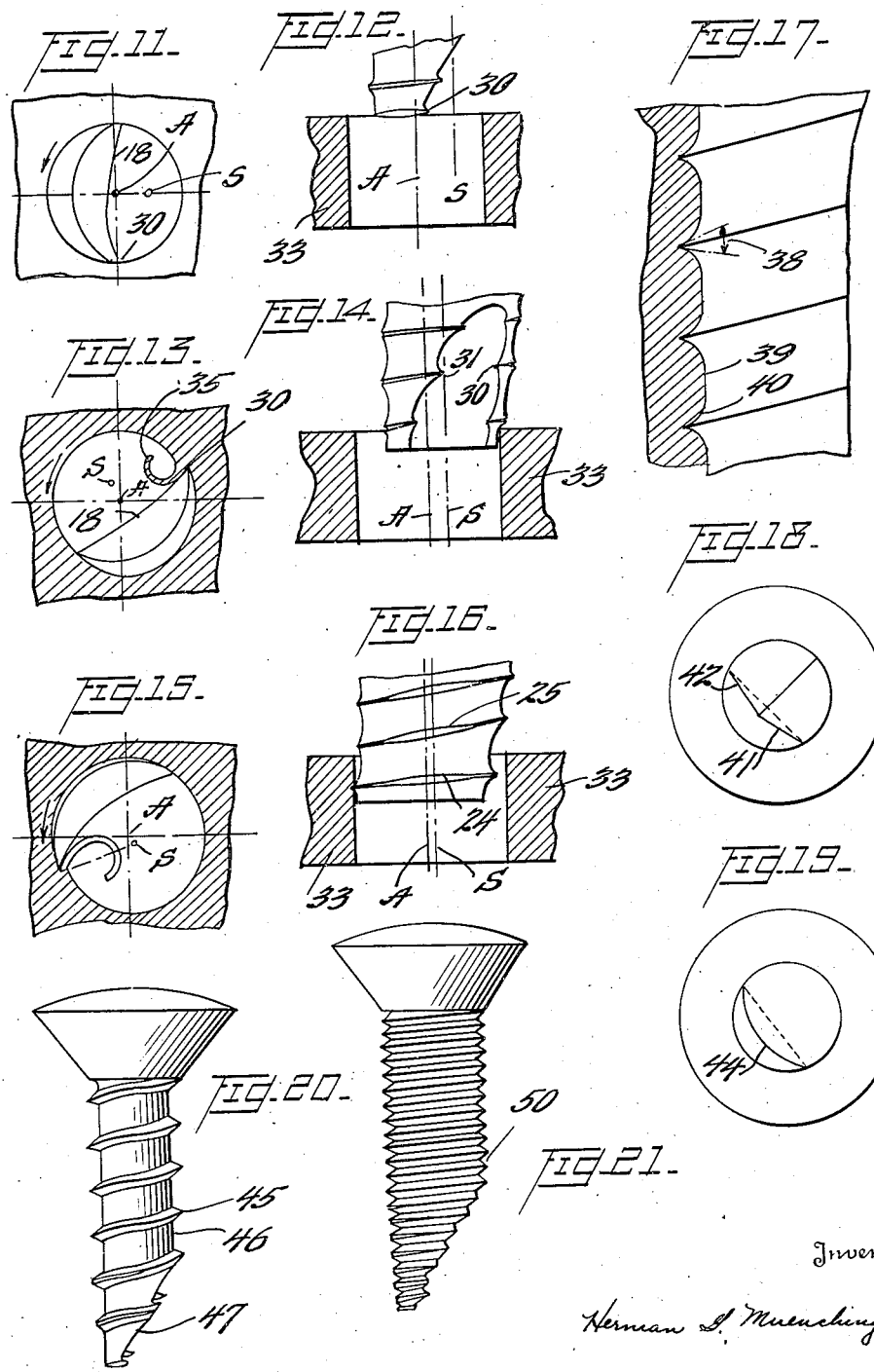

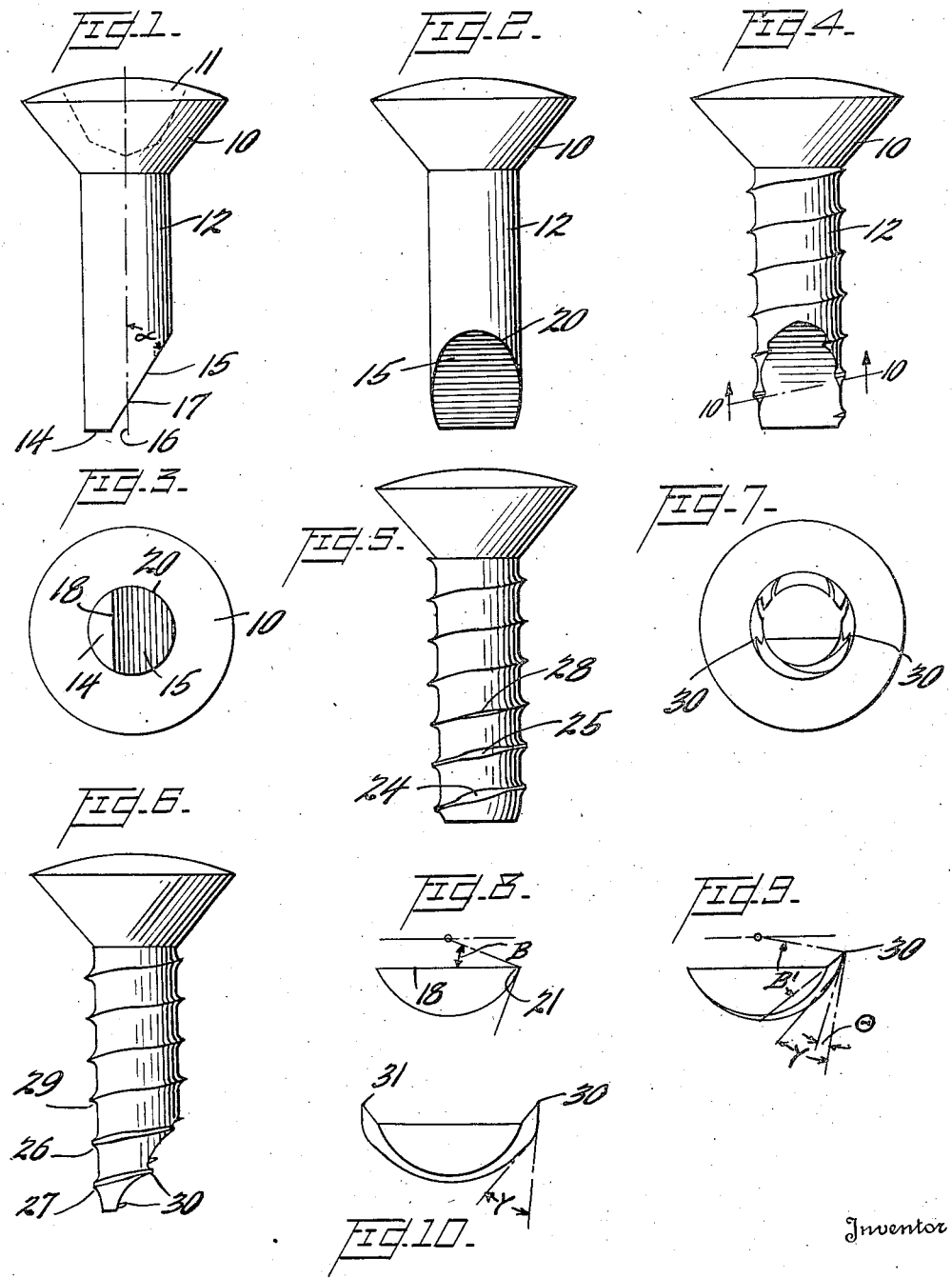

Patented Apr. 25, 1944

2,347,360

UNITED STATES PATENT OFFICE 2,347,360

SELF-TAPPING SCREW

Herman Gustave Muenchinger, South Foster, R. I., assignor to American Screw Company, Providence, R. I., a corporation of Rhode Island Application August 3, 1942, Serial No. 453,410

14 Claims. (Cl. 85—47)

This invention relates to screws and more particularly to screws for tapping threads into various hard materials such as plastics, die castings, sheet metal and the like.

It is a general object of the present invention to provide a novel and improved form of self-tapping screw.

More particularly it is an object of this invention to provide a self-tapping screw of unique form as to thread, flute, pilot portion and cutting edges whereby improved tapping characteristics are achieved and superior holding power results.

An important object of the invention consists in the provision of a self-tapping screw adapted for cutting a mating thread into various tough and/or brittle material with a minimum of chipping and cracking and which will require less torque or driving effort whereby a smaller pilot hole may be used to give greater depth of actual thread engagement and consequently greater holding power.

Another important object of the invention consists in the provision of a self-tapping screw wherein cutting edges are provided as a result of rolling the threads onto a blank subsequent to the cutting of a unique flute on the same whereby the edges of the rolled threads are carried beyond the walls of the flute to provide superior angles of rake, relief and clearance.

A further important object of the invention consists in the provision of a self-tapping screw in which the removal of metal to provide a flute to form cutting edges, likewise provides a pilot tip on the screw facilitating its entrance into a pilot opening in the material into which it is to be tapped and which provides certain of the unique cutting qualities as well as forms storage space for chips.

One of the features of the invention consists in the arrangement of the cutting edges at a greater radius from the axis of the shank of the screw than any of the following threads on the pilot point whereby a certain clearance throughout the whole length of the finished threads on the point of the screw is provided in the mating tapped recess, thereby limiting the torque necessary for driving the screw substantially to that required for cutting the threads and reducing the frictional effects so common in previous forms of self-tapping screws.

Another feature of the invention consists in the manner of obtaining the pilot point and flute in a self-tapping screw without the necessity of expensive cold-header dies as normally required in any self-tapping screw having a tapered point. This, in cooperation with the subsequent rolling of the threads, provides the beneficial effects of work hardening of the cutting portions of the thread, eliminating the necessity of case hardening, whereas other constructions whose cutting portions are formed by machining the screw after the thread is rolled require a case hardening operation to develop sufficient hardness and strength in the cutting portions.

A further feature of the invention which contributes both to the cutting efficiency of the tapping portion of the screw and the holding efficiency of the remaining portion consists in a unique thread configuration which divides the shear area of the threads on the screw and those in the mating recess closely in accordance with the respective shearing strengths of the several materials whereby maximum holding efficiency is provided.

Other and further objects and features of the invention will be more apparent to those skilled in the art upon a consideration of the accompanying drawings and following specification wherein are disclosed several exemplary embodiments of the invention with the understanding that such modifications in thread configuration and combination of the several embodiments may be made as fall within the scope of the appended claims without departing from the spirit of the invention.

In said drawings:

Figure 1 is a side elevation of a blank on which the self-tapping screw of the present invention is formed showing the initially clipped tip;

Figure 2 is a view similar to Figure 1 taken at right angles thereto;

Figure 3 is an end view of the screw blank looking toward the tip;

Figure 4 is a view similar to Figure 2 showing the threads as applied to the blank by rolling;

Figure 5 is a view similar to Figure 4 but taken at 180° thereto showing the unusual conformation of the threads on the back of the pilot tip;

Figure 6 is a view similar to Figure 1 but showing the threads in their varying form on the body and tip or pilot portions of the screw;

Figure 7 is a view similar to Figure 3 after the threads have been applied;

Figure 8 is an enlarged end view of the tip of the blank prior to the thread rolling operation illustrating the rake angle provided by the clipping of the tip of the blank;

Figure 9 is a view similar to Figure 8 but illustrating the increase in rake angle and the provision of clearance and relief angles formed by the thread rolling operation;

Figure 10 is an enlarged sectional view taken in the plane of one of the threads on the pilot tip as, for instance, on line 10—10 of Figure 4;

Figure 11 illustrates an end elevation of the screw tip as it first enters the pilot hole in the work-piece to be tapped showing the relative positions of the axes of the screw and of the pilot hole at the start of the threading operation;

Figure 12 is the corresponding fragmentary view of the screw, and with the pilot hole in section taken on the axis of the latter with the screw in the same position as in Figure 11, more clearly illustrating the misalignment of the axes;

Figure 13 is a view similar to Figure 11 after the screw has been driven approximately 120° from the position of that figure and disclosing well the effect of the rake and relief angles of the cutting edge and the reduction in misalignment of the axes;

Figure 14 is a view corresponding to Figure 12 but with the screw in the position of Figure 13;

Figure 15 is a view similar to Figures 11 and 13 but showing the relative location of the screw and pilot hole axes after the screw has been driven approximately 300° from the starting position of Figure 11;

Figure 16 is the corresponding view on the axis of the pilot hole with the screw in the position of Figure 15;

Figure 17 is a fragmentary axial section on an enlarged scale and through the uninterrupted portion of the threads on the screw shank and work-piece after the same has been completely introduced into the pilot hole and demonstrating in detail the unique thread formation with its very sharp profile, substantially flat root and moderate fillet at the junction of the root and thread;

Figure 18 shows a modified embodiment of the point formation wherein the flute is formed by cutting on two obliquely intersecting planes to provide increased rake angle;

Figure 19 is a view similar to Figure 18 but showing the cut taken on a slightly concave surface;

Figure 20 is a view similar to Figure 6 showing an optional thread form found superior for use in sheet metal work; and Figure 21 illustrates a thread construction more adaptable for use in heavier metals.

Self-tapping screws have been developed to a point where they are fairly satisfactory and efficient when used with sheet metal or other relatively thin materials which are not brittle, but they have not proven so satisfactory for use with hard materials, particularly plastics of the formaldehyde type which are rather brittle, and with the laminated plastics bound by phenol formaldehyde compositions which are extremely tough. This brittleness and toughness offer difficulties to the use of the conventional threading methods resulting from introducing self-tapping screws into pilot holes in the material. The present invention provides a self-tapping screw which eliminates the difficulties experienced with conventional forms of self-tapping screws when used with materials just described, but it will be apparent that the new device is not limited for use with any particular plastic but is adapted for a wide range of such materials as well as for use with sheet metal, in aluminum die castings and in similar materials and constructions. It is adapted to economically cut a mating thread into various tough and brittle plastics with a minimum of chipping or cracking which has heretofore often necessitated the replacement of a plastic unit. The most common objection to the use of conventional tapping screws in plastics has been the number of rejects caused by chipping or cracking the material.

Another objection to the use of the conventional form of self-tapping screw for deep-hole engagement in plastics and the like has been the high driving torque required resulting from the friction of the fully formed threads which immediately follow those of the cutting edge of the conventional tapping screw. The driving torque is so great that in an effort to reduce the driving fatigue it is common practice for the operator to enlarge the pilot hole in the work-piece resulting in decreased thread engagement and less holding power with the consequent danger of stripping the threads and the failure of the fastening.

In accordance with the present invention, however, the cutting edges of the thread are provided with an adequate rake angle which makes for clean sharp cutting as distinguished from the usual pressing or forcing of the material aside. This reduces the amount of effort necessary for the actual cutting of the threads. Furthermore, the present invention provides adequate clearance and relief angles causing the thread to be cut in such a way that the friction is reduced almost to zero. This provides a screw in which the driving torque is substantially that necessary for the actual cutting which is done by cutting edges of a form superior to those which can be attained on conventional types of tapping screws without materially weakening them.

Referring now to the drawings for a more complete understanding of the invention, there is shown in Figures 1–17 inclusive the preferred embodiment of the same wherein like reference characters in the several figures denote similar parts. The invention is shown as applied to a screw of the oval countersunk head type, although it is clear that the invention resides in the thread configuration and shaping of the shank and that the head is unimportant except as a driving means for the screw. The blank illustrated in Figure 1 has a conventional form of head 10 provided as shown with a Phillips recess 11 considered to be the best for use with this type of screw because of the superior driving torque which can be exerted thereby. The shank 12 of the screw blank is of the conventional cylindrical form of the desired length and diameter for the most satisfactory holding power in the work for which it is designed. The end 14 of the cylindrical shank is cut off at right angles and subsequently clipped or bevelled along plane 15 inclined at an acute angle α to the axis 16 of the shank. The plane 15 intersects the axis at 17 within the length of the shank so that the flat portion 14 of the tip is considerably less than half the area of the cylindrical cross-section. This is well illustrated in Figure 3 where the chord 18 formed by the intersection of 14 and 15 is seen to be spaced from the vertical diameter just slightly less than one-half the radius of the cylinder. This chord is therefore of considerably less length than the diameter for a purpose which will be later described. The intersection of the plane 15 with the surface of the shank cylinder forms a partially elliptical face having the border 20 clearly seen in Figure 2.

The angle α is preferably approximately 30° to provide the most satisfactory results, but obviously such conditions as the type of material, desired size of pilot hole, and the like might possibly dictate the use of a different inclination than that illustrated. It will be apparent that the chord 18 will be of less length than the minor axis of the ellipse 20. As viewed in Figure 2, it will be seen that the portion of the tip below the minor axis of the ellipse actually constitutes a pilot which, although having curved edges, is more or less wedge-like in configuration both parallel to the plane 15 and at right angles thereto. As seen in Figure 8, the chord 18 where it intersects the curve of the cylinder will form a cutting edge 21, the positive angle of rake of which is illustrated by the angle β lying between the chord and the radius intersecting the cutting edge 21. This is a very substantial angle and would provide a good cutting edge, for instance, on a reamer. It is preferred that the pilot hole in which the screw is introduced be not substantially different in diameter from the length of the chord 18.

The blank completely formed as shown in Figures 1, 2 and 3 is subjected to a normal thread forging or rolling operation wherein the blank is rolled between a pair of dies moving substantially parallel to each other and in opposite directions and provided with faces including inclined scores cross-sectioned to form the desired thread configuration on the blank. Except for the unusual thread configuration illustrated, the rolling operation, as regards the action of the dies, is a normal one, the dies gradually approaching toward the end of the stroke to start with a shallow thread and finish the same to the desired depth before the blank is discharged from between the dies.

The action on the blank of the present invention, however, is unique because of the cut-away tip forming as it does, in effect, a flute for the tapping operation. Obviously when the one rolling die is positioned beneath the cut-away portion of the tip, this tip is unsupported against the thrust of the opposing die so that it is temporarily deformed and the fragment of the cylinder which extends clear to the end 14 of the blank does not receive a full depth of thread. Because of the flexing just described, the depth of thread decreases toward the tip where there is a minimum as clearly illustrated in Figure 5. The crest portion of the lowermost thread opposite the clipped tip is materially widened and flattened as seen at 24 where the metal is not pushed into the bottom of the grooves of the die. The next thread above shows at 25 a reduced width of flattened top indicating a slightly greater depth of thread as seen at 26 in Figure 6, the height being greater than at 27 on the lowermost thread. Again at 28, in Figure 5, a very minor flattening of the tip shows that this thread is almost complete and is of greater depth as shown at 29 in Figure 6. Figure 6 also shows that each interrupted section of thread increases in depth from its minimum directly opposite the cut-away portion to almost a full thread at 90° from the widened portions 24, 25 and 28. This is also evident from the different degrees of sharpness of the edges of the thread in Figure 5. In Figure 6 it will be seen that the thread roots all lie along a cylindrical surface both on the body portion and on the tip. The crests of the threads on the body portion of the shank lie along the surface of a larger cylinder, but they withdraw from this cylinder along the tip as clearly seen in Figures 4, 5 and 6.

In the operation of rolling the thread, a certain amount of metal is caused to flow both radially inwardly and radially outwardly since the diameter of the blank is greater than the root diameter of the final thread but less than the maximum diameter across the crests of the threads. Where this metal is entirely confined as by the dies themselves, it is constrained to follow the helix forming the thread, but where there is not complete restraint as at the junction of the threads with the inclined surface 15, some of the metal flows out beyond this surface, forming extensions of the thread which may be clearly seen at 30 in Figures 6 and 7 where they have been somewhat exaggerated for the sake of clearness.

Those extruded portions of the thread helix on the advancing side of the plane 15 act as cutters for removing the material which will form the mating thread in the substance into which the screw is inserted. The shape taken by these hook-like extrusions is interesting and important. Shown somewhat exaggerated in Figures 9 and 10 it will be seen that the hook 30 in transverse section on the advancing side as illustrated in Figure 9, now has an increased angle of rake to the cutting edge represented by β, this being the angle existing between the radius from the center to the point 30 and an extension of the back face of the cutting point.

These cutting hooks or tips are also provided with the important clearance angle γ shown in Figure 9 which is accentuated because of the flattened portions 24, 25 and 28 on the threads only a few degrees advanced from the cutting edge.

The rolling operation likewise produces a relief angle θ clearly seen in Figure 9. The combination of the relief and clearance angles plus the positive angle of rake ensures clean, sharp cutting without crumbling and ensures a thread so cut as to prevent undue friction between the following threads on the screw and those of the mating part. The rolling operation being a cold forging process produces a certain amount of hardness and toughness in the screw threads and particularly in the overhanging hook-like cutting edges and they can in many instances be used without the necessity of a subsequent heat treatment or case carburizing.

It will be noted that the thread formation on the trailing edge of surface 15 is similar and symmetrically opposed to that of the cutting edges. These trailing hooks 31 do not materially aid in the thread cutting operation, but they do serve to assist in retaining the screw in the threads already cut during the initial entrance operation and they aid in maintaining the proper alignment of the screw as it is being started.

It has already been pointed out that the action of the rolling dies slightly flex the tip of the shank in the direction of the surface 15 and this, together with the inclined cut-away portion, produces a pilot tip on the screw which is of less dimension in any direction than the maximum root diameter of the threads on the finished portion of the screw. This peculiar shaped pilot tip has unique advantages in the starting of the cutting operation.

Referring now to Figures 11-16 inclusive for an illustration of this operation, it will be noted that the axis of the pilot hole in the material into which the screw is driven will be designated A, while the axis of the screw shank will be designated S. Figure 11 and its corresponding longitudinal section Figure 12 show the screw just entering the pilot hole in the workpiece 33 and it will be seen that the widest portion of the tip tends to conform to the diameter of the unthreaded aperture provided its diameter is equal to or less than the length of line 18 forming the chord of the tip. This throws the axis S of the screw materially out of alignment with the axis A of the aperture. This position is automatically assumed when the screw is introduced into the pilot hole. As the screw is driven, however, there is a natural tendency, caused by the configuration of the pilot tip, for the two axes to gradually align themselves as shown in the two following figures, in which the screw has been rotated in driving approximately 120° into the work-piece from its starting point illustrated in Figures 11 and 12. Hence in Figure 13 the axis S has approached somewhat closer to the axis A and the chord 18 has moved away from the axis A. This tendency follows from the exertion of a relatively heavy pressure on the cutting edge at the points of contact with the material. This cutting edge therefore becomes a fulcrum about which the screw tends to rotate. This provides maximum cutting effort with minimum driving torque. The shaving illustrated at 35 clearly illustrates the cleanness of the cut and a complete removal of the material forming the mating thread.

Figures 15 and 16 represent the position of the pilot tip after the screw has been turned approximately 300° from the initial position and it will now be seen that the axes A and S have approached quite close. It may be said that the axis S has been travelling in a spiral about the axis A. This tendency of the axes to align themselves resulting from the conformation of the several parts of the tip already described, causes a relatively heavy pressure on the cutting edge at its point of contact with the material being cut. In the starting operation the slight axial thrust exerted by the operator aided by the pilot effect causes the hooks 30 on the leading edge to bite sharply into the unthreaded wall of the aperture in the work-piece. The sharp edges of the hooks, together with their several cutting angles as already described, aided by the pressure exerted by the misalignment of the axes, causes the material to be cut with extreme ease. Due to the initial misalignment of the axes the relief angle θ and the clearance angle γ are much greater with respect to the material being cut and this condition further improves the drivability as well as the effectivenes of the cutting.

As the screw is driven further in and the axes tend to align themselves, the relief and clearance angles decrease with respect to the material being cut and gradually approach those shown in Figure 9 at the time the axis of the screw and of the pilot hole are completely aligned. As before mentioned, the axis of the screw as viewed endwise traces a spiral path, the action resembling that of a corkscrew. When the screw reaches the point in its entrance where the surface 15 cuts the axis S at the entrance to the hole, the axes are theoretically aligned and sufficient threads are formed to ensure the continuation of the tapping operation by virtue of the sharp hooks 30 with their rake and relief angles without the need for the pressure on the cutting edges described as effected because of the misalignment of the axes.

It will be clear that there is provision for suitable space where a portion of the tip was removed to provide for adequate chip storage. Moreover the inclined position of the surface 15 deflects the chips generally away from the cutting edges and prevents clogging or jamming, a difficulty common in the use of conventional tapping screws. The true cutting action as distinguished from the wedging or crumbling action of some forms of screws contributes further to the chip clearance and the elimination of jamming.

The preferred form of thread for plastic tapping screws is illustrated in Figure 17 in greatly enlarged detail in which the crest angle 38 is considerably less than the conventional 60° sharp V form as used on conventional machine threads. This sharp angle gives greater effectiveness in tapping in that less material must be removed and consequently less driving effort consumed.

Experimentation has revealed that the ultimate shearing strength of the average plastic varies up to $\frac{1}{10}$ that of steel indicating that, if possible, the area of the plastic exposed to shear should be ten times that of the steel to obtain the most efficient holding, i. e., a joint which will develop the full shearing capacity of each material. It is obvious that the type of failure experienced when threads are stripped on a screw or pulled from the plastic material is a shearing action. To secure the above conditions a very widely spaced thread is desirable, but if this were obtained in the normal way it would require excessive torque for cutting. The applicant has rather preferred to decrease the width of the thread form itself. The root of the thread is wide and substantially flat as shown at 39 and there is a generous fillet 40 at the junction of the thread and its root which tends to reduce chipping of the more brittle plastics as well as to strengthen the screw thread considerably. This thread form lends itself particularly well to thread rolling, the metal flowing to form the extremely sharp hooks 30 previously referred to in a specially desirable manner. The more acutely angled thread removes less material in the cutting and hence exposes less area to friction which reduces the driving torque. The smoothly curved flanks of the thread tend to mold rather than crumble the plastic material between the threads, thereby permitting the use of a smaller pilot hole and a consequent greater depth of thread engagement between the screw and plastic which further contributes to the strength of the joint.

In Figure 18 is shown an embodiment in which conditions are identical with those in the embodiment just described except that the pilot tip is formed by the junction of two plane surfaces 41, 42 at a very obtuse angle. This improves the rake angle of cutting.

The same results can be obtained by cutting the tip away to leave a concave surface as shown at 44 in Figure 19.

Figure 20 illustrates a form of screw in which the thread is of the spaced V form, the helix 45 being formed and spaced on the surface 46 of a cylinder. The thread is rolled after the tip 47 is cut in the same manner as described in connection with the preferred embodiment. This type of thread has been found somewhat more desirable for use in sheet metal work.

For use in die castings of aluminum and other soft metals the form of thread illustrated in Figure 21 at 50 is deemed the most satisfactory. This is substantially the conventional V thread 60° angle applied on a blank having the clipped tip as already discussed.

Having thus described the invention, what is claimed as new and desired to be secured by Letters Patent is:

1. A self-tapping screw of the type described comprising a head, a cylindrical shank, the free end of said shank being clipped to provide a surface at an acute angle to and intersecting the shank axis, a thread rolled onto said shank after the shank is clipped and cutting extensions of the thread itself projecting beyond said surface in the direction of rotation of the screw.

2. A self-tapping screw of the type described comprising a head, a cylindrical shank, the surface of said shank being threaded for most of its length, a portion of the shank having metal removed to provide a surface intersecting the helix of said threads at a large angle, the thread ridges being extended out beyond the plane of said surface in the direction of entrance of the screw to form cutting hooks for tapping.

3. A self-tapping screw of the type described comprising a head, a cylindrical shank, the surface of said shank being threaded for most of its length, a portion of the shank having metal removed to provide a surface intersecting the helix of said threads at a large angle, the thread ridges being extended beyond the plane of said surface in the direction of entrance of the screw to form cutting hooks for tapping, said hooks having cutting edges inclined to said surface to provide a substantial rake angle.

4. A self-tapping screw of the type described comprising a head, a cylindrical shank, the surface of said shank being threaded for most of its length, a portion of the shank having metal removed to provide a surface intersecting the helix of said threads at a large angle, the thread ridges being extended beyond the plane of said surface in the direction of entrance of the screw to form cutting hooks for tapping, said hooks having cutting edges projecting beyond said surface and each so shaped as to provide a substantial relief angle for the cutting edge.

5. A self-tapping screw of the type described comprising a head, a cylindrical shank, the surface of said shank being threaded for most of its length, a portion of the shank having metal removed to provide a surface intersecting the helix of said threads at a large angle, said actual threads being extended beyond the plane of said surface in the direction of entrance of the screw to form cutting hooks for tapping, said hooks being formed so as to extend radially beyond the normal continuation of the thread helix whereby large clearance and relief angles are provided.

6. A self-tapping screw of the type described comprising a head and a cylindrical shank cut off squarely at the free end, the shank being clipped in a plane intersecting the shank axis at an acute angle and the square bottom so as to leave less than half of the latter, substantially all of said shank being threaded, the threads on the portion back of the clipped surface being progressively shallower toward the tip whereby a pilot tip is provided for ready insertion into a prepared hole.

7. The method of making a self-tapping screw comprising forming a cylindrical shank with a head, clipping metal from the free end of the shank along a plane intersecting the axis of the shank within the cylinder thereof at an acute angle to said axis, leaving the end of the shank of less than one half of a circle, rolling a thread on the whole shank by a normal rolling operation whereby the side of the shank opposite the removed portion is provided with threads of progressively less depth toward the end, resulting from flexing of the unsupported end portion by the threading dies, and thereby forming a pilot portion of less maximum cross-section than any whole portion of the shank.

8. The method of making a fastening screw comprising rolling a continuous thread on a substantially cylindrical headed blank having its free end formed by a surface normal to the axis of the blank and a surface at an acute angle to said axis, said surfaces intersecting to restrict said first surface to an area of less than one-half of the blank cross-section, and using sufficient pressure on the rolling dies to temporarily distort the reduced end of the blank whereby the threads on the portion thereof opposite the inclined surface are incompletely formed.

9. A fastener having a body provided with a rolled thread extending for its full length, the threads near the free end being interrupted once per turn in progressively decreasing portions of a turn starting at the free end with an interruption of greater than 180°, the remaining portion of each interrupted turn varying in thread depth in decreasing ratio of maximum to minimum as the portions increase in arc.

10. A fastener having a thread rolled on a body of generally cylindrical form with a portion removed at the entering end to interrupt a number of thread turns, the metal of the interrupted turns extending in the form of cutting edges into the space vacated by the removed portion.

11. A fastening screw having its shank provided with a continuously threaded portion next its head end, and an adjoining interrupted threaded portion extending to the entering end, the threads of said latter portion being rolled after removal of a diagonal slice of the shank which intersects the end thereof whereby the thread segments are carried out beyond their supporting shank on the entering ends, each of these thread extensions being so formed by the rolling as to have a cutting edge of good rake and relief.

12. A thread cutting screw for use in plastics and including a threaded shank having a holding section and an entering section, and a head formed integral with the shank, the thread on the shank being of relatively coarse pitch, the thread convolutions of said entering section along one side of the shank only being of progressively decreasing depth toward the tip while the root circle remains substantially constant in diameter, the opposite side of the shank being removed from the entering section in the form of a wedge the butt of which is at the end of the screw and of an area greater than one-half of the area of cross-section of the shank.

13. In a self-tapping screw for plastics, a shank having a very sharp shallow helical thread of a plurality of spaced turns of very coarse pitch, a shallow concave groove lying between said thread turns throughout the extent thereof, the bottom of said groove being substantially flat and merging into the thread with a generous fillet, the shearing area of thread to that of the material in which it will be embedded being of the order of 1 to 10, said thread being rolled on a cylindrical shank, a portion of said shank having been removed to interrupt several turns of the thread, each of said interrupted turns extending out over the surface formed by the removal of said portion and being shaped to provide cutting edges having substantial rake, relief and clearance angles.

14. A fastener having a body provided with a rolled thread so interrupted for several turns at the free end as to provide a cutting lip for each turn, the metal of each lip extending out beyond the general plane of the interrupting surface by an amount substantially proportional to its distance from the axis of the body.

HERMAN GUSTAVE MUENCHINGER.